(12) United States Patent
Coushaine et al.

(10) Patent No.: US 7,841,732 B2
(45) Date of Patent: Nov. 30, 2010

(54) SHOWER LIGHT

(75) Inventors: Charles Coushaine, Rindge, NH (US);
Nathan Winters, Merrimack, NH (US);
Joseph Seale, Gorham, ME (US)

(73) Assignee: OSRAM SYLVANIA Inc., Danvers, MA (US)

( * ) Notice: Subject to any disclaimer, the term of this patent is extended or adjusted under 35 U.S.C. 154(b) by 279 days.

(21) Appl. No.: 12/288,894

(22) Filed: Oct. 24, 2008

(65) Prior Publication Data

US 2010/0103646 A1    Apr. 29, 2010

(51) Int. Cl.
*F21V 33/00*    (2006.01)
(52) U.S. Cl. .......................................... 362/96; 362/192
(58) Field of Classification Search .................... 362/96, 362/192
See application file for complete search history.

(56) References Cited

U.S. PATENT DOCUMENTS 5,358,177 A   10/1994 Cashmore
5,699,833 A   12/1997 Tsataros
6,609,804 B2   8/2003 Nolan et al.
6,805,458 B2  10/2004 Schindler et al.
2007/0037470 A1   2/2007 Rothan
2008/0022920 A1 *  1/2008 Custodis ...................... 362/192
2009/0121044 A1 *  5/2009 Lo et al. ........................ 239/71

\* cited by examiner

*Primary Examiner*—David V Bruce
(74) *Attorney, Agent, or Firm*—William E. Meyer; Edward S. Podszus

(57) ABSTRACT

A shower lamp assembly is formed with a water driven electric generator to power an LED light source. The assembly includes a first channel directing water to drive the generator. The generator is supported on a movable portion of a bypass valve that opens on a high water flow condition to direct a portion of the water to a second channel way from the generator. The generator is otherwise tuned to provide sufficient electricity under low water flow conditions to properly power the lamp. The lamp generator is then protected by the bypass valve from damage during high water flow conditions.

6 Claims, 10 Drawing Sheets

SHOWER LIGHT

CROSS-REFERENCE TO RELATED APPLICATIONS

BACKGROUND OF THE INVENTION

1. Field of the Invention

The invention relates to electric lamps and particularly to electric lamps powered by a water source.

2. Description of the Related Art Including Information Disclosed Under 37 CFR 1.97 and 1.98

Bathroom showers are enclosed, and can be rather dim or even dark without electric lighting. Emerging electrical standards in response to the corrosive results of steam and damp are requiring shower lights to be more water tight, and may even exclude them from the immediate shower area. Additional light that is safe and efficient would in general be useful in a bathroom shower. Occasionally there are power failures, and an independent light source in a shower would be convenient. It is known that the water flow from a spigot or showerhead may be used to generate electricity and that electricity can be used to power a lamp. However, the available amount of water flow can be extremely variable. It is common that water pressure drops in a community in the early morning when there are a large number of residents using water at the same time, and water pressure available in a home with a well can be quite different from water pressure in a large city apartment building. There is then a need for a shower light that can operate with highly variable water flows.

BRIEF SUMMARY OF THE INVENTION

A shower light may be constructed from a water conduit having an inlet coupler, a generator cavity and an outlet. An electric generator is located in the generator cavity having a rotor assembly including a rotor supporting a magnetic field source, the rotor being retained in a first channel and being turned by mechanical interception of water flowing through the first channel. The electric generator has a coil assembly having an electrically conductive coil positioned adjacent the rotor to generate electric current on interception of the rotating magnetic field. The lamp assembly includes a relief valve that opens in response to a water pressure condition. The relief valve on opening directs water away from the rotor assembly in the first channel and directs water to a second channel. An illumination assembly having an LED powered by electric current generated by the electric generator is supported on the assembly directing light in the region exterior to the lamp housing.

DETAILED DESCRIPTION OF THE INVENTION

Figure 1:
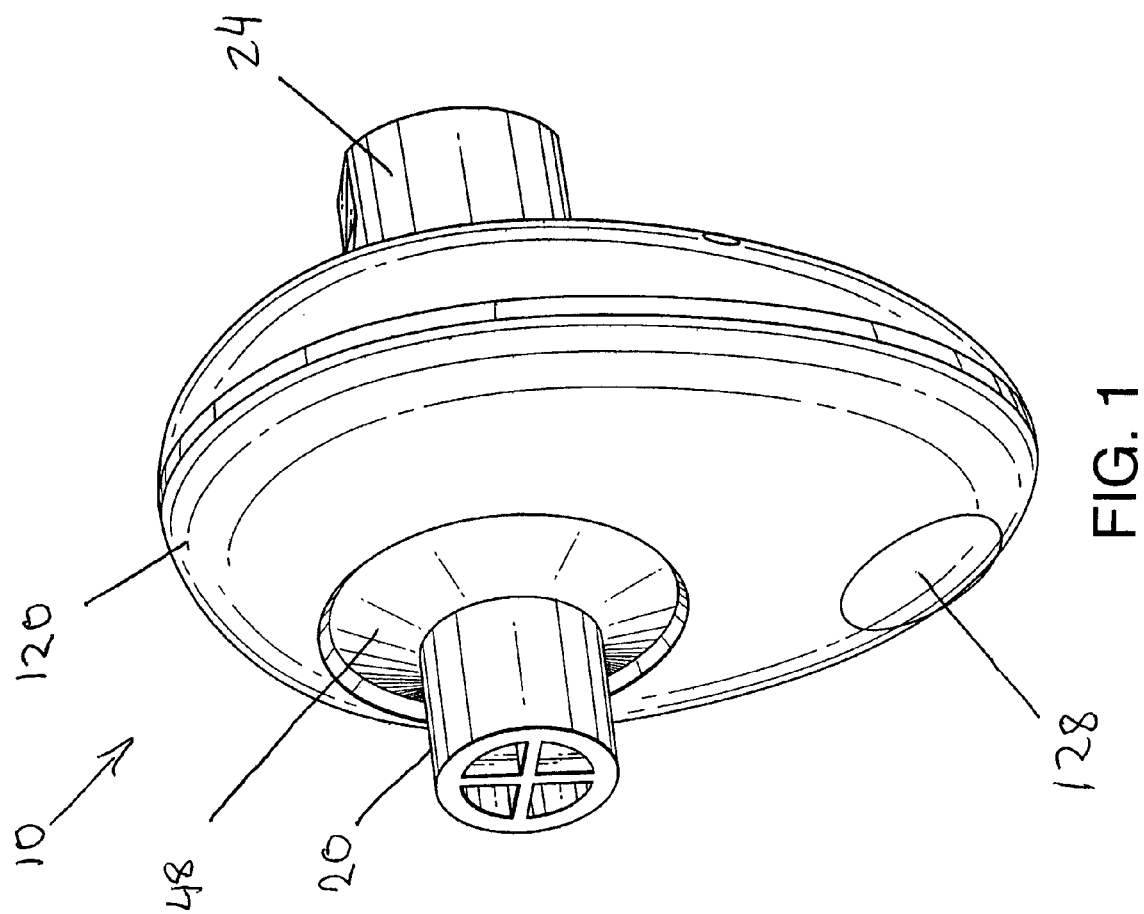
FIG. 1 shows a side perspective view of a preferred embodiment of a shower light.
Figure 2:
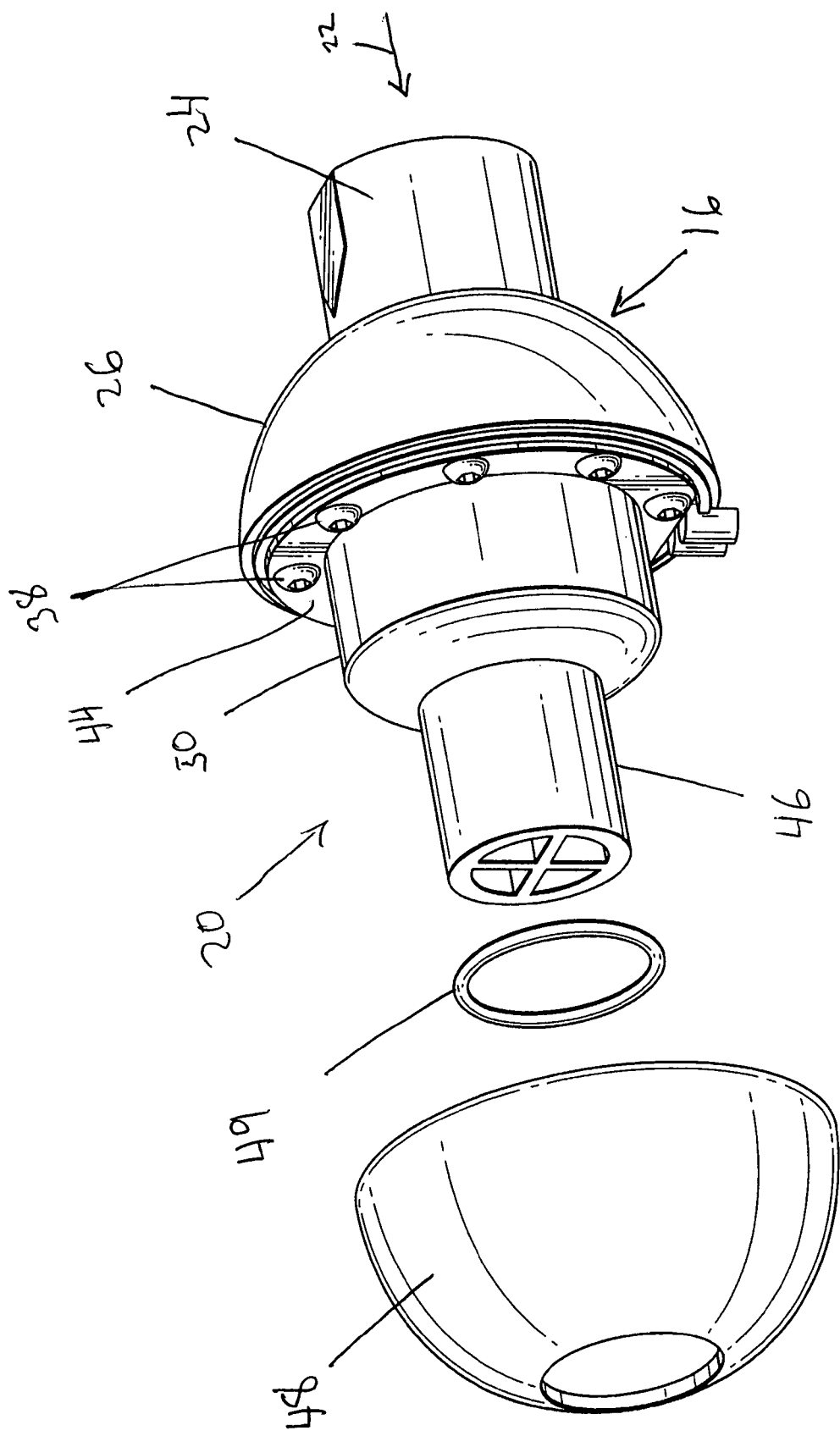
FIG. 2 shows an exploded view of a preferred embodiment of a water conduit assembly.

FIG. 1 shows a cross sectional view of a preferred shower lamp 10. FIG. 2 shows an exploded view of a preferred water conduit 12 and generator housing 50 assembly of a shower lamp 10. A shower lamp 10 can be made with a water conduit 12, for example having an inlet coupler 16, an O-ring 59, an outlet coupler 20, and an outlet cover 48. The water conduit 12 defines a water tight cavity through which input water may flow through to an outlet fixture (if any) such as a showerhead. A ball surface is formed on the exterior of the water conduit 12 on which an LED lamp housing 120 may pivot on. Formed in the central ball portion of the conduit is a cavity to retain an electric generator assembly. The generator assembly includes an impeller, a drive shaft, a rotor with an attached magnet, electric coils, and a valve for directing water through a first channel to an impeller for driving the generator to generate electricity, and for directing excess water to a second channel bypassing the electric generator.

Figure 3:
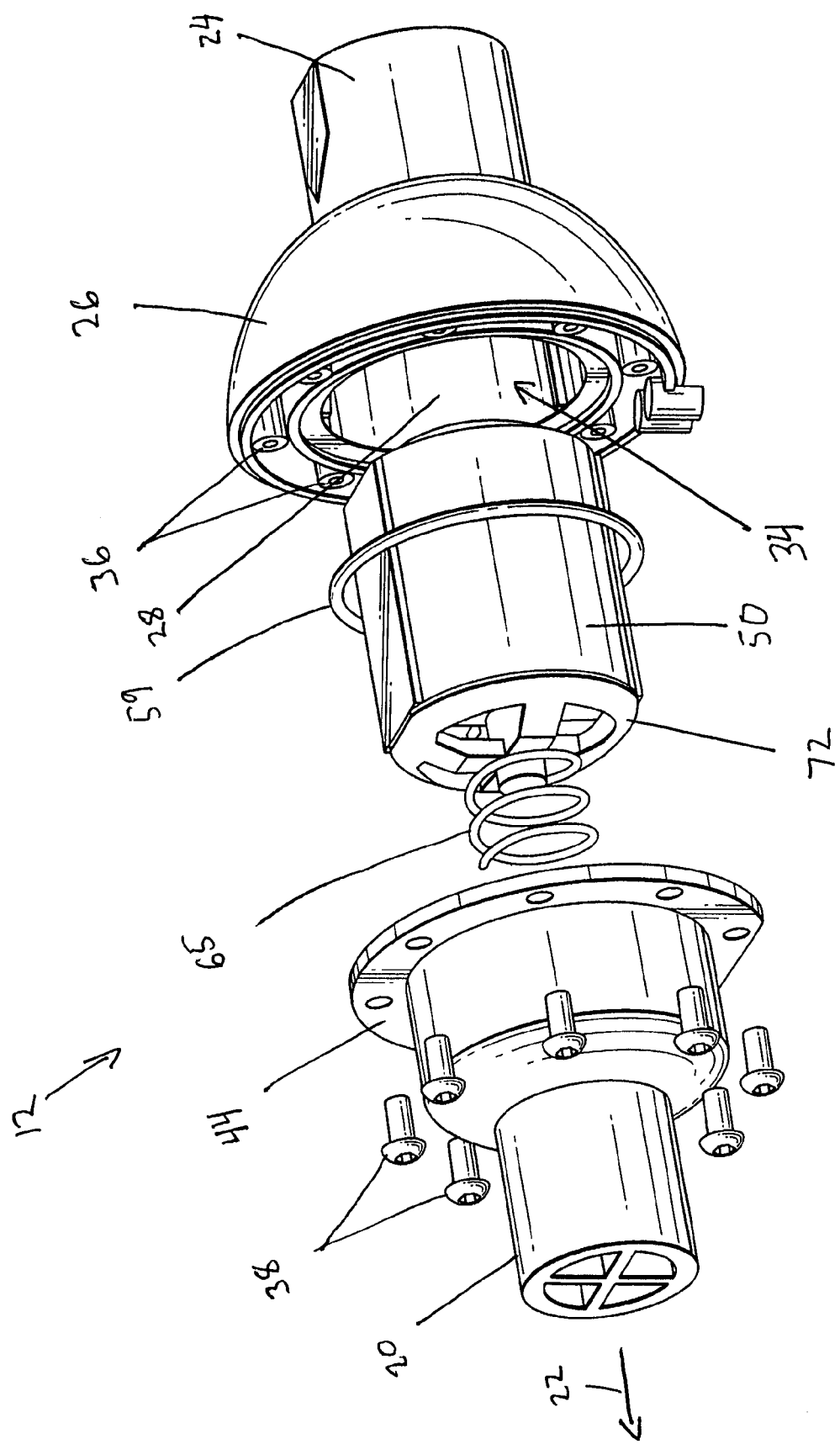
FIG. 3 shows an exploded view of a preferred water conduit and generator housing assembly for a shower light.

FIG. 2. shows an exploded view of the preferred water conduit 12 assembly. The preferred water conduit 12 is formed from an inlet coupler 16 and an outlet coupler 20 that extend along a central axis 22. The preferred inlet coupler 16 has a water inlet with the exterior form a cylindrical pipe 24 leading along the exterior surface to a hemispherical surface 26. FIG. 3 shows an exploded view of a preferred water conduit and generator housing assembly for a shower light. The inner wall 28 of the inlet coupler 16 is formed with a valve seat 30 forming a portion of a bypass valve 32. The valve seat 30 encircles an interior end of the inlet pipe 24. Downstream of the valve seat 30, and radially displaced radially outward from the axis 22, the inner wall of the inlet coupler 16 defines a generally cylindrical cavity, referred to as the conduit chamber 34. Intermediate the inner wall 28 and the exterior wall of the inlet coupler 16, that is the outer hemispherical surface 26, are molded recesses 36, for example 8 bolt holes, extending parallel to the axis 22 and equally spaced around the axis 22. The recesses 36 are designed to receive threaded couplers 38. The downstream end of the inlet coupler 16 is formed to include a support for a water seal, such an O-ring 18. A stepped ring, flat seal or similar ring like sealing structure may be used.

The preferred outlet coupler 20 is formed with a flange 44 that is sized and shaped to mate with the downstream coupling end of the inlet coupler 16, for example by having a plurality of similarly spaced openings for the threaded couplings 38. The flange 44 may then be mated to the inlet coupler 16 by threading the threaded couplings 38 through the flange 44 to the recesses 36. The outlet coupler 20 also has an interior surface portion defining a similar, second section of the generally cylindrical conduit chamber 34. The outlet coupler 20 interior wall extends downstream to a coupler, preferably in the form of a cylindrical outlet pipe 46. In the preferred embodiment, the inlet coupler 16 and the outlet coupler 20 have similarly formed axially extending keying features, such as one or more axial grooves, axial ribs or flat faces that are aligned one with the other when the inlet coupler 16 and the outlet coupler 20 are properly mated to define the enclosed cylindrical conduit chamber 34. The outlet pipe 46 may be coupled, (or not) to a device such as a shower head, for example by a threaded pipe end.

The preferred outlet coupler 20 includes a section of a hemispherical shell that is sized and shaped to mate with the hemispherical surface 26 of the inlet coupler 16, while enclosing the cylindrical portion of the outlet coupler 20, and flange 44. This section of a hemispherical shell may be provided by as a section of a cover 48 that at least partially encloses the outlet coupler 20. The spheroidal section of outlet cover 48 is sized and shaped to form with the exterior spheroidal surface 26 of the inlet coupler 16 a sufficient portion a sphere or ball that an LED housing may be supported for pivotal engagement. The outlet cover 48 may be clipped, snap fitted, threaded, glued or similarly mounted to the inlet coupler 16, or to the outlet coupler 20 to form a secure spheroidal surface portion on which the LED lamp housing may be pivoted. The outlet cover 48 may be sealed to the outlet coupler 20, for example with an O-ring 49 to limit water or other materials from detrimentally entering the enclosed space.

Figure 4:
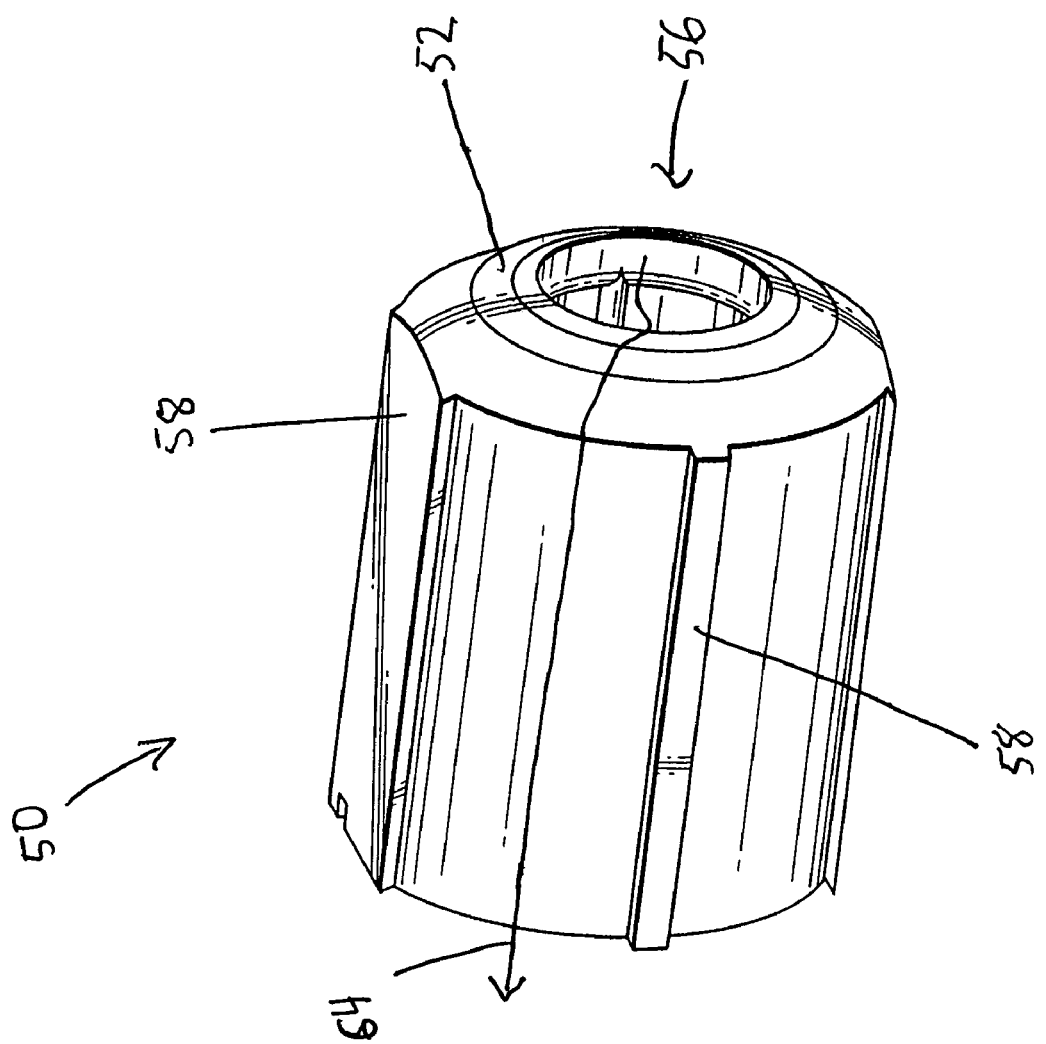
FIG. 4 shows a side perspective view of a preferred generator housing for an embodiment of a shower light.

FIG. 4 shows a side perspective view of a generator housing 50. Located in the conduit chamber 34 is an electric generator assembly having a generator housing 50. On the forward or upstream end of the generator housing 50 is a valve seat 52 forming with the first valve seat 30 a bypass valve 32. The generator valve seat 52 is sized and positioned to close with the inlet coupler valve seat 30. The generator housing 50 includes a generator inlet 56 encircled by the generator valve seat 52 that lets the water flow into the generator housing 50. The inlet coupler 16 and first valve seat 30 then seal with the generator housing 50 and valve seat 52 directing water into an end opening inlet 56 in the generator housing 50 during at least low flow water conditions. The exterior of the generator housing 50 includes one or more axially aligned keying features such as an axial slot, rib or flat face(s) 58 to fit with the corresponding axial keying feature(s) rib, slot or flat face 60 formed on the interior wall of the conduit chamber 34. The generator housing 50 may then axially slide with respect to the inlet coupler 16 and the outlet coupler 20 on the meshed keying elements 58 and 60, but does not rotate around the axis 22. The generator valve seat 52 may then be opened or opened or closed with respect to the inlet coupler 16 at valve seat 30. When the two valve seats 30 and 52 are seated one to the other, as under low flow conditions, water is directed into the generator housing 50, and a first water channel 62. When the two valve seats 30, and 52 are not closed one the other, as when there is a high water flow condition, water additionally flows along the exterior the sides of the generator housing 50 and the interior walls of the inlet coupler 16 and the outlet coupler 20 in a second channel 64. A pressure spring 65 may be positioned to apply a closing force against the generator housing 50 directing the generator housing 50 valve seat 52 to seal the inlet coupler valve seat 30. The pressure spring 65 may be mounted intermediate an outlet end wall of the conduit chamber 34 and the generator housing 50. Other coupling points may be devised for mounting the pressure spring 65, such as a pulling spring on the front end of the generator housing 50, or a spring surrounding the generator housing 50. It is only important that the pressure spring 65 urge the valve seats 30 and 52 to close with decreasing water pressure. In the preferred embodiment, the pressure spring 65 provides sufficient force to seal the generator housing 50 valve seat against the conduit valve seat 22 during a low water pressure condition (low flow condition). The pressure spring 65 is also not so strong but sufficiently weak that the generator housing 50 is unseated from the inlet coupler 16 valve seat 30 during a higher pressure condition, one that exceeds the low water pressure condition. The pressure spring 65 force is chosen to open when the flow rate in the first channel 62 exceeds the water flow needed to generate the maximum electricity needed for the lighting system. Thereafter, there is no further need for additional electric current, so the excess water flow is diverted through the outer conduit channel 64 between the generator housing 50 and the inner wall of the conduit that is of the inlet coupler 16 and outlet coupler 20. Diverting water during high flow rates protects the generating assembly from being overdriven. The pressure spring 65 then permits water flow through the second channel 64 intermediate the generator housing 50 and the interior side of the inlet coupler 16 and outlet coupler 20.

In the preferred embodiment, the conduit chamber 34 is substantially cylindrical in its central section and the exterior of the generator housing 50 is similarly generally cylindrical, but each has axially extending ribs, slots or flat faces 58. An O-ring 59 is mounted on the exterior of the generator housing 50 riding over the ribs or flat faces 58, providing a locating guide between the inner wall 28 of the conduit chamber 34 and the outer wall of the generator housing 50. The generator housing 50 can then slide in the conduit chamber 34 and water can flow in the second channel 64 between the slots or ribs or flat faces 58 and the O-ring 59 and the inner wall of the conduit chamber 34. The exterior of the generator housing is then offset at least in part from the conduit chamber 34 wall 28 defining the second channel 64 for the overflow water channel intermediate conduit chamber 34 and the generator housing 50 extending from the generator valve seat 30 to the generator housing outlet guide 72.

Figure 5:
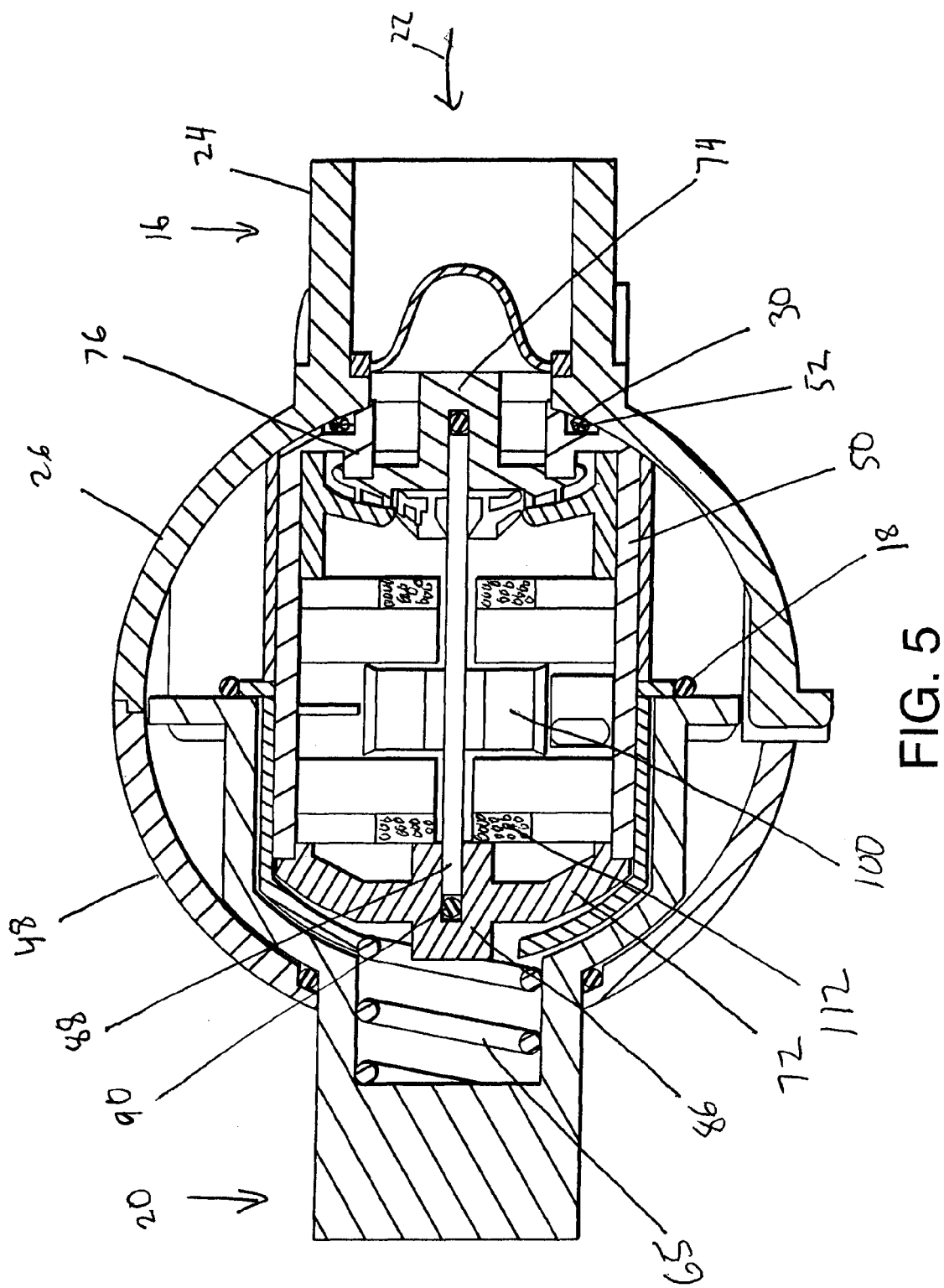
FIG. 5 shows a cross sectional view of a preferred embodiment of a conduit assembly for a shower light.
Figure 6:
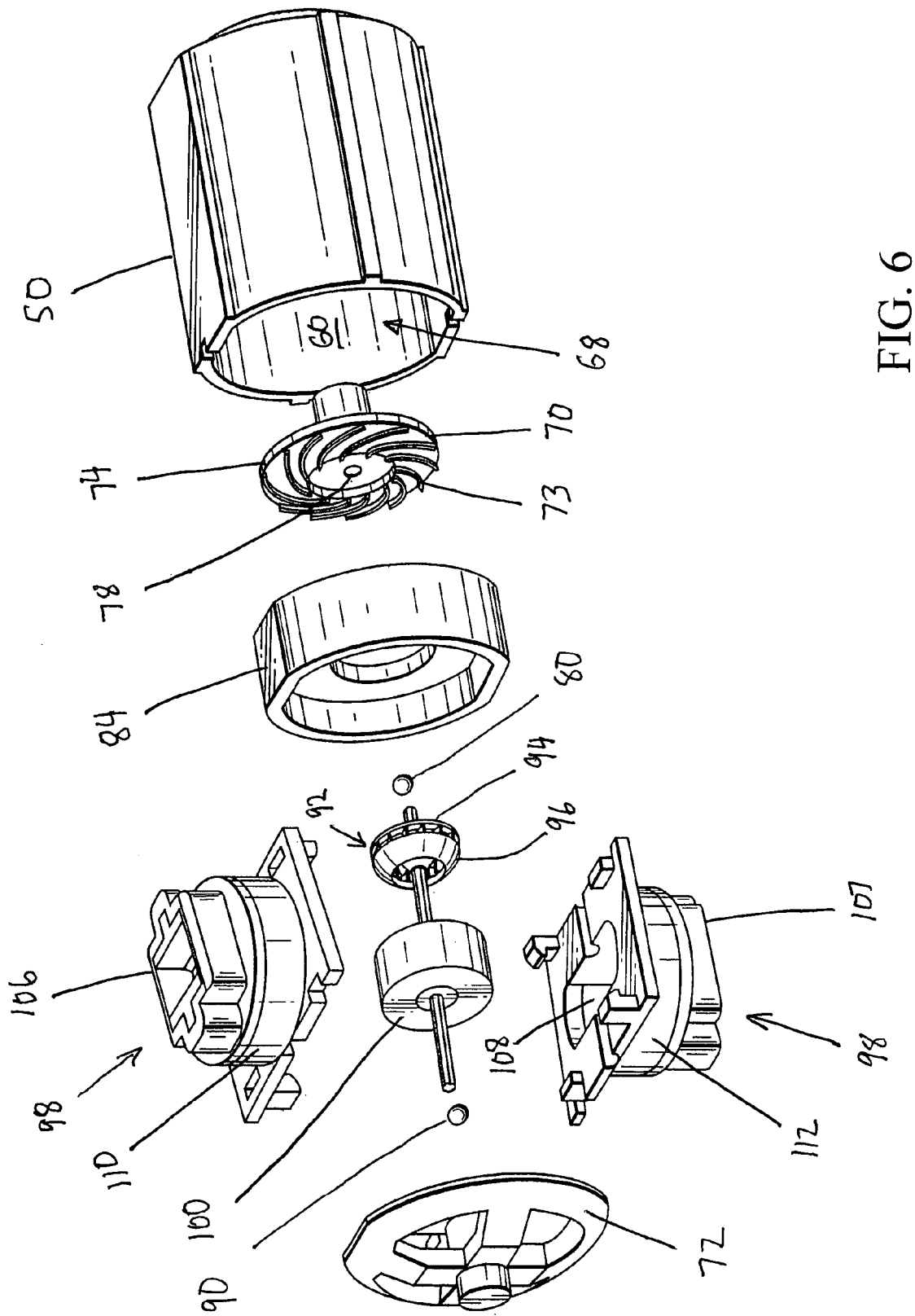
FIG. 6 shows a cross sectional view of a preferred embodiment of a generator assembly for a shower light.
Figure 7:
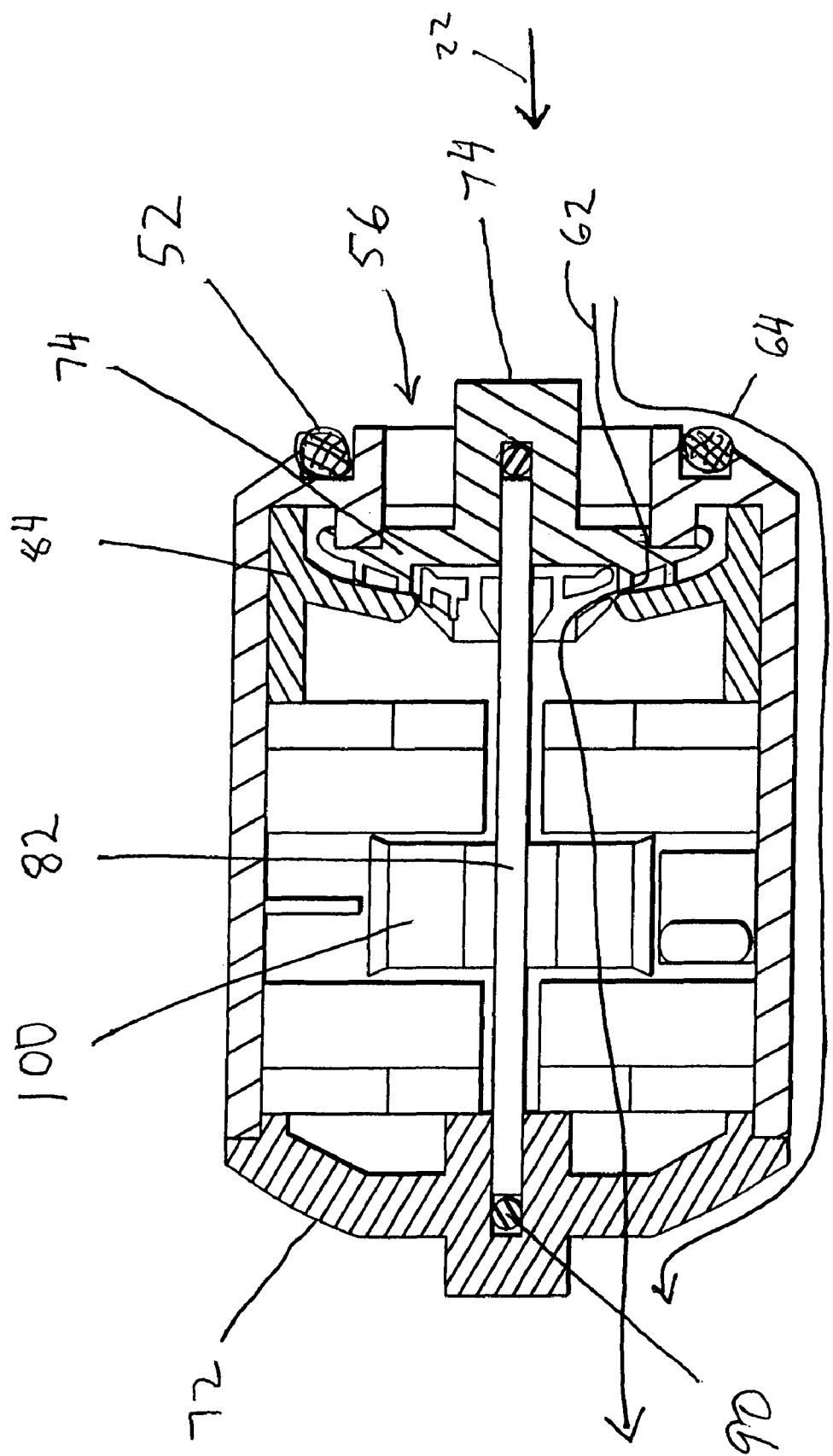
FIG. 7 shows a cross sectional view of a preferred embodiment of a generator assembly for a shower light.

FIG. 4 shows a side perspective view of a preferred generator housing for an embodiment of a shower light. FIG. 5 shows a cross sectional view of a preferred embodiment of a conduit assembly for a shower light. FIG. 6 shows a cross sectional view of a preferred embodiment of a generator assembly for a shower light. FIG. 7 shows a cross sectional view of a preferred embodiment of a generator assembly for a shower light. The generator housing 50 has an inner wall 60 defining an enclosed impeller cavity 68 that extends from an input impeller 70 to an outlet guide 72. The preferred input impeller 70 includes one or more spiraling inward vanes 73. The preferred input impeller is formed as a cap 74 spanning the inlet to the generator housing 50, and is seated on an internal lip 76 formed in the upstream end of the generator housing 50. The preferred cap 74 also includes an axial recess 78 to receive a ball bearing 80 and a forward end of the rotor shaft rotor shaft 82. The cap 74 may be held in place against the generator housing interior wall by the lip 76 formed on the interior wall of the generator housing 50 by a sleeve 84. The cap 74, lip 76 or sleeve 84 are formed separately or in a combination with the others to create one or more water passages to pass water entering the generator inlet 56. An outlet guide 72 is fitted to the down stream end of the generator housing 50 that preferably includes appropriately placed exit water passages spaced around a centrally placed holder 86 for a down stream end of the rotor shaft 82. The holder 86 includes a similar shaft recess 88 and ball bearing 90 to axially support a second end of the rotor shaft 82.

Figure 8:
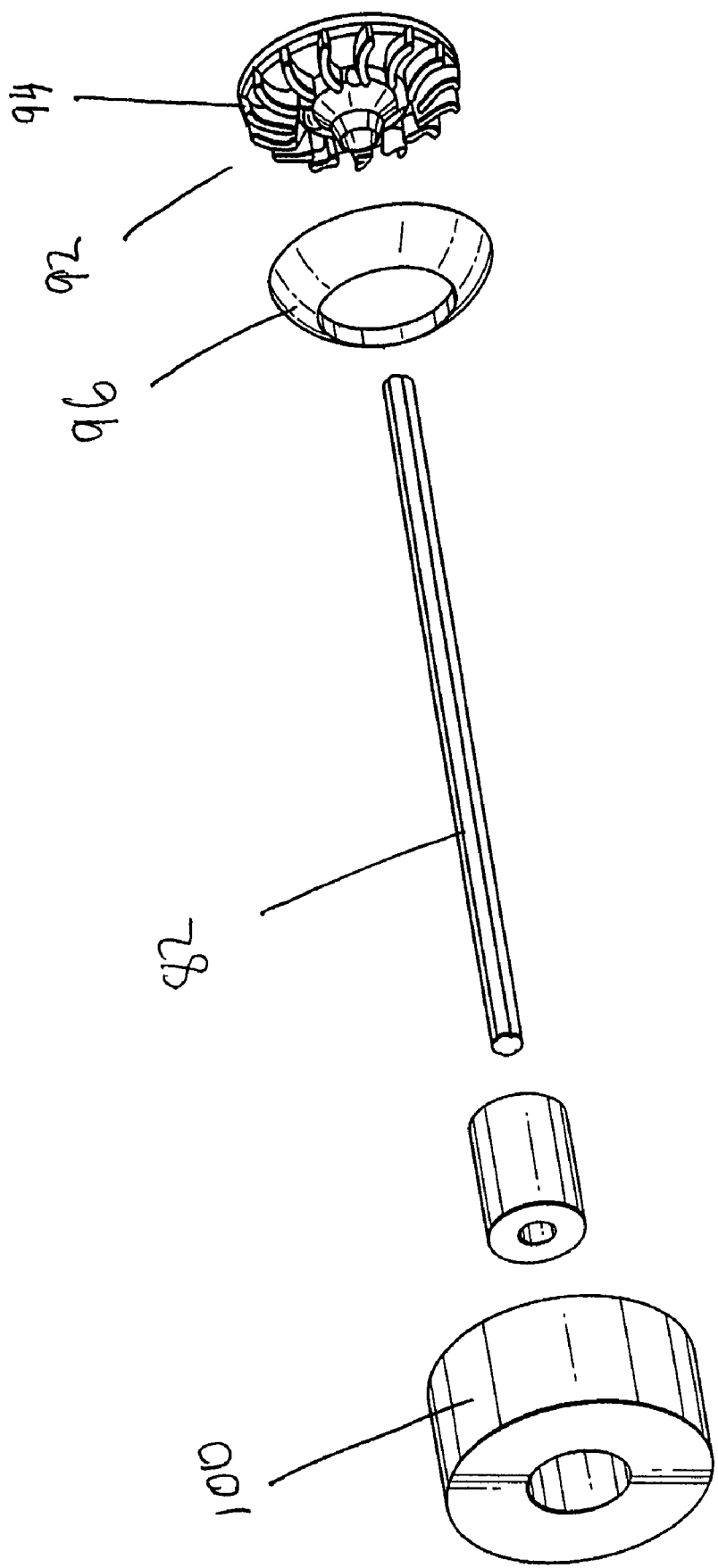
FIG. 8 shows an exploded view of a rotor assembly for a shower light.

FIG. 8 shows an exploded view of a rotor assembly for a shower light. Rotationally fixed on the rotor shaft 82 immediately down stream of the inlet impeller 70 is a driven impeller 92 having a series of radially spiraling vanes 94 partially enclosed by an impeller cap 96. Water flowing though the generator housing 50 is spiraled inwards by the fixed inlet impeller 70 to then encounter and rotationally drive the driven impeller 92 that is fixed to the rotor shaft 82. The rotor shaft 82 then turns in the axially aligned shaft recesses 78 and 88. The water then flows through the remainder of the generator cavity around the coil housing 98 and out through generator outlet guide 72.

Figure 9:
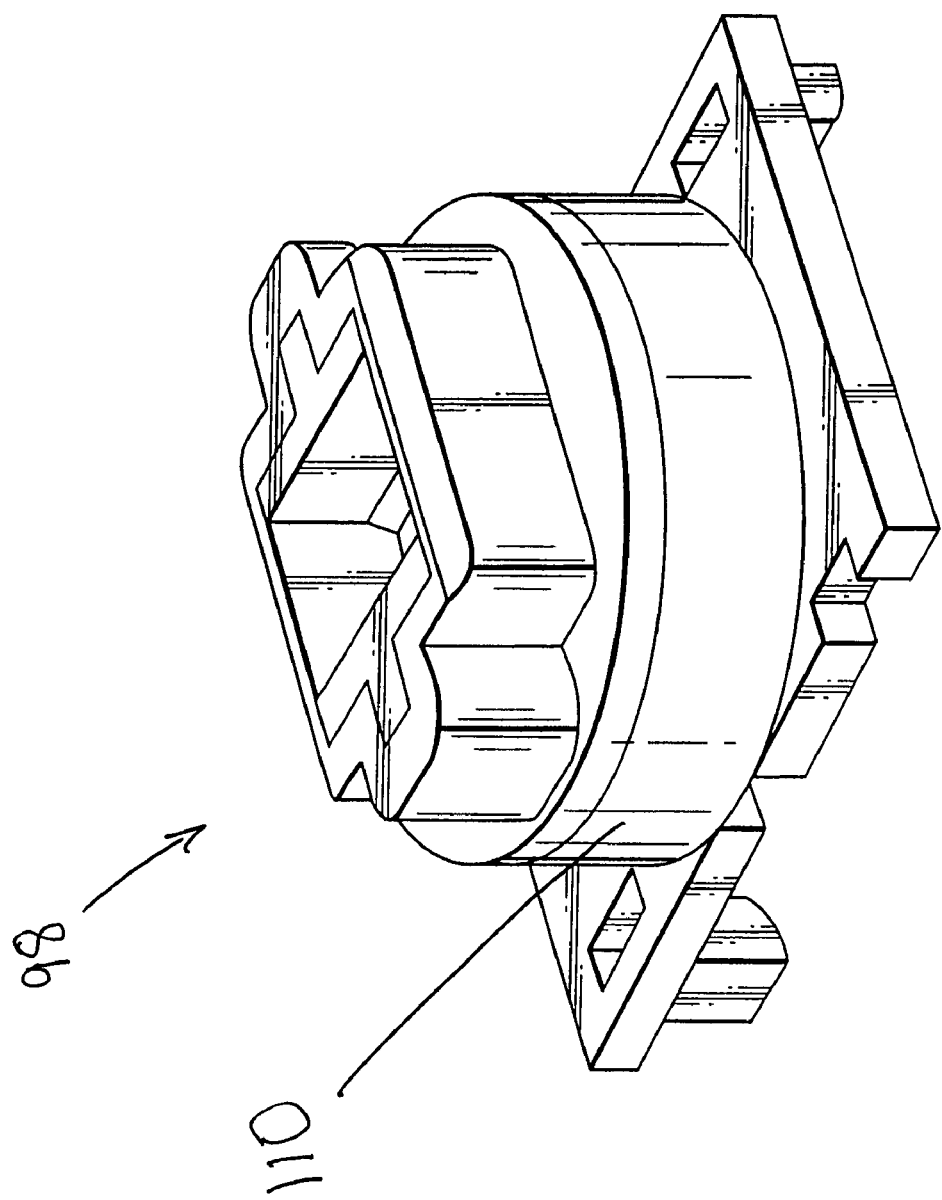
FIG. 9 shows a perspective view of a one half of a two-part, symmetric coil housing.

Downstream of the driven impeller 70, and mounted on the rotor shaft 82 is a permanent magnet 100. The magnet 100 is enclosed in a coil housing 98. The preferred coil housing 98 comprises two molded plastic halves 106, 107 defining an interior cavity 108 for the magnet 100. FIG. 9 shows a perspective view of a one half of a two-part, symmetric coil housing. The two plastic halves 106, 107 close on the rotating magnet 100. The exterior of each the coil housing 98 halves 106 and 107 includes a coil reel bracket 108. The preferred coil housing 98 then supports two coils 110, 112, one on each half 106, 107. Each electrical coil 110, 112 has a respective coil axis substantially perpendicular to the rotor shaft 82 and pointed toward the rotating magnet 100. The electrical coil(s) 110, 112 is (are) sized, shaped and positioned with respect to the magnet 100 on the rotor shaft 82 so as generate a useful electric current, when the magnet 100 is rotated on the rotor shaft 82. The leads 102, 104 from the coils 110, 112 are ducted through the coil housing 98 across the generator cavity through generator housing 50 across the conduit chamber 34 through the conduit wall (water tight) to the exterior of the water conduit 12.

Figure 10:
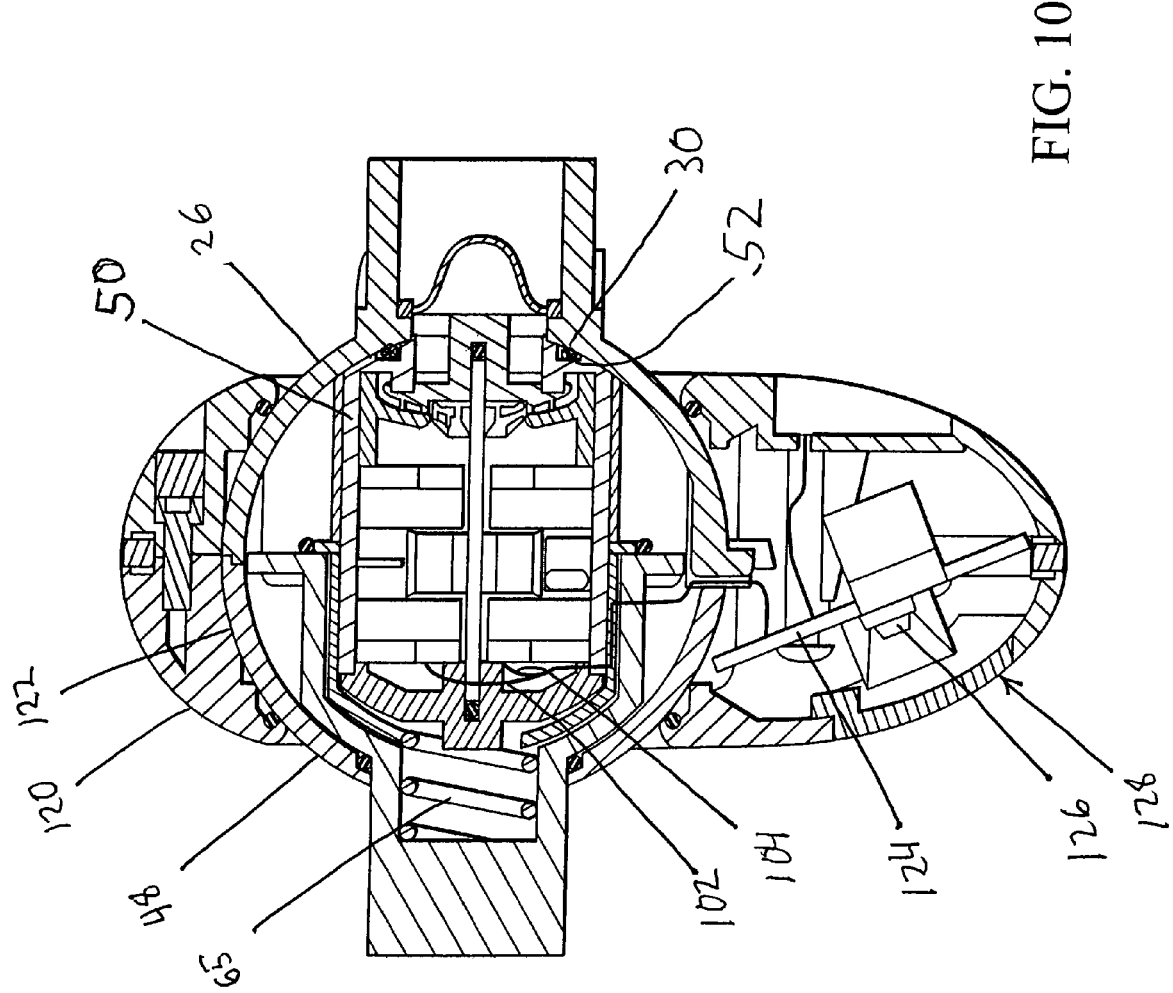
FIG. 10 shows a cross sectional view of a preferred embodiment of a shower light.

FIG. 10 shows a cross sectional view of a preferred embodiment of a shower light. A lamp housing 120 is supported from the ball portion (hemispherical surface) formed by the surfaces 26, 48 of the water conduit section. The preferred lamp housing 120 has a through passage with a passage surface 122 positioned on the water conduit (26, 48) for snug rotational engagement of the conduit housing 26, 48 with the lamp housing 120. The lamp housing 120 further defines an enclosed cavity enclosing an electrical leads 102, 104 extending to the coil(s) 110, 112 as the case may be, and connecting to a power conditioning circuit (circuit board 124) coupled to an LED 126 mounted on the lamp housing 120. The LED 126 produces light from the electricity generated by the magnet 100 and coil(s) 110, 112 assembly with the flow of water through the couplers 16, 20 and impeller 92. The light from the LED 126 is directed to the exterior in the shower region to generally illuminate shower region, preferably through a light transmissive protective window 128.

In the preferred embodiment as water flows through the conduit the water encounters the fixed impeller 70 acquiring a rotational spin. If the water pressure is less than a set value, the generator housing 50 is thrust forward by the pressure spring 65, sealing the valve seats 30 and 52, forcing all the incoming water to pass through the drive impeller 72 to generate electricity. If the water flow exceeds the minimum water flow value to generate the maximum electricity needed, the generator housing 50 is pressed back against the pressure spring 65, opening the valve seats 30 and 52, and releasing water from the inlet to the side around the generator housing 50. As long as the water pressured is held to a value above the minimum, the generator housing 50 is thrust backwards, opening the bypass valve. In the preferred embodiment, with progressive pressure increase above the minimum, the opening area of the bypass valve increases. With increasing pressure the bypass valve is progressively opened (up to a mechanical maximum) providing increasing relief. The reverse is equally true. As the pressure drops, the bypass valve (seats 30, 52) closes, thereby keeping the water flow through the generator housing approximately constant.

The LED lamp housing includes electrical circuitry to condition the electric power received form the coils, and thereafter power one or more LEDs supported on the LED lamp housing. The LED lamp housing is formed with an internal surfaces sized and shaped to pivot or rotate on the surface of the spheroidal portion of the conduit. An on/off or other switching element may be included in the lamp housing. It is understood that while white light may be the most desirable light to supply, colored or combinations of colors or differing intensities of light, timers, and rechargeable batteries may provided for in the lamp housing and circuitry as is known in the art of LED lamp making. While there have been shown and described what are at present considered to be the preferred embodiments of the invention, it will be apparent to those skilled in the art that various changes and modifications can be made herein without departing from the scope of the invention defined by the appended claims.

What is claimed is:

1. A shower light comprising:
    a water conduit having an inlet coupler, a generator cavity and an outlet;
    an electric generator located in the generator cavity having a rotor assembly including a rotor supporting a magnetic field source, the rotor being retained in a first channel and being turned by mechanical interception of water flowing through the first channel, and the electric generator having a coil assembly having an electrically conductive coil positioned adjacent the rotor to generate electric current on interception of the rotating magnetic field;
    a relief valve opening in response to a water pressure condition, the relief valve on opening directing water away from the rotor assembly in the first channel and directing water to a second channel;
    and an illumination assembly having an LED powered by electric current generated by the electric generator.

2. The shower light assembly in claim 1, wherein the relief valve opens when the water pressure exceeds a predetermined value.

3. The shower light assembly in claim 2 wherein the relief valve opens progressively when the water pressure exceeds a predetermined value.

4. The shower light assembly in claim 1, including a conduit housing having an exterior housing wall including at least a portion of a surface of rotation; and the LED is mounted on a LED housing having a wall including at least a portion of a surface of rotation positioned, the LED housing being mounted adjacent the conduit housing allowing rotation of the LED housing along the surface of the conduit housing.

5. The shower light assembly in claim 4, where in the conduit housing exterior housing wall includes a section of a sphere (ball); and the LED housing wall includes corresponding section of a ball socket allowing rotation of the LED housing ball socket along the surface of the conduit housing section of a sphere (ball).

6. A shower light comprising:
    a water conduit having a wall defining a water conductive passage having an inlet coupler leading to an inlet section leading to an overflow valve seat encircling an end of the inlet section, and a conduit chamber leading to an outlet, the water conduit generally defining a central axis extending from a center of the inlet to a center of the outlet;
    a guide impeller positioned adjacent the end of the inlet section;
    an electric generator located in the conduit chamber, the generator having a generator housing with a rotor inlet encircled by a generator valve seat sized and positioned to close with the overflow valve seat, a wall defining an enclosed rotor cavity, and a rotor outlet leading to the conduit outlet; the exterior of the generator housing slidably positioned in the conduit chamber; the exterior of the generator housing being offset at least in part from the conduit chamber wall defining an overflow water channel intermediate the conduit chamber and the generator housing extending from the generator valve seat to the generator housing outlet, and a pressure spring positioned to apply a closing force against the generator housing to seal the generator valve seat with the conduit valve seat, the pressure spring being intermediate the conduit chamber and the generator housing; the pressure spring providing sufficient force to seal the generator housing valve seat against the conduit valve seat during a low water pressure condition (low water flow condition); and sufficiently weak to let the generator housing to unseat from the housing valve seat during a pressure condition exceeding the low pressure condition, permitting water flow through the overflow channel intermediate the generator housing and the interior side of the generator wall; the generator housing having an end cap axially closed with an end of generator housing to define the generator cavity, the generator housing having a water outlet leading to the housing chamber;

a guide impeller having one or more guide faces, the guide impeller being fixed to the conduit housing and positioned intermediate the inlet coupler; and the generator housing passage, and imparting to a water flow through the conduit a rotational spin around the axis to water flowing from the inlet to the conduit chamber;

a rotor having a shaft having a first end axially seated in the guide impeller and a second end axially seated in the generator housing cap, the shaft supporting a drive impeller at a first end, and a generator magnet at a second end, the drive impeller being axially aligned with and adjacent the guide impeller, the generator magnet including a permanent magnet providing a magnetic field perpendicular to the axis at least along an outer face of the magnet; the shaft being axially aligned and supported for axial rotational;

the magnet being enclosed in a coil housing, the coil housing supporting an electrical coil having a coil axis substantially perpendicular to the shaft; the coil housing having sealed bearings for the shaft and defining a cavity sufficient to enclose the magnet; the electrical coil being sized, shaped and positioned with respect to the magnet on the shaft so as generate a useful electric current, when the magnet is rotated on the shaft;

the exterior of the conduit having a surface defining at least a rotationally smooth portion;

and a lamp housing having through passage with a passage surface positioned the conduit for snug rotational engagement of the conduit with the lamp housing;

the lamp housing further defining an enclosed cavity enclosing an electrical coupling extending to the coil and connecting to a power conditioning circuit coupled to an LED mounted on the lamp housing directed to the exterior to generally illuminate shower region.

\* \* \* \* \*